Aug. 16, 1938.    H. F. TAYLOR ET AL    2,126,934
APPARATUS FOR CONDITIONING CONTAINERS
Original Filed Oct. 14, 1931    3 Sheets-Sheet 1
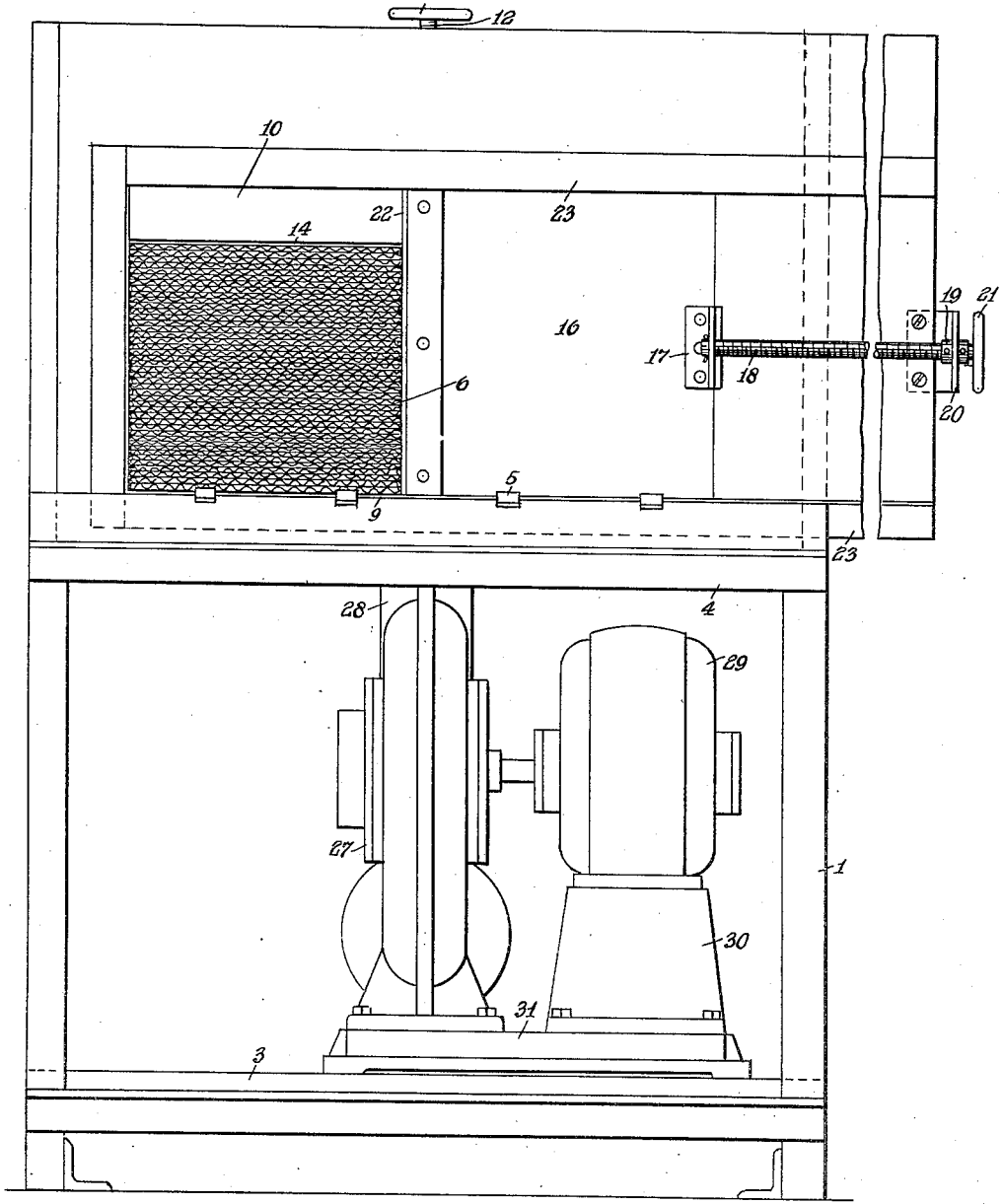
Harden F. Taylor INVENTORS
& Alexander H. Cooke
Wm. S. Pritchard BY
ATTORNEY.

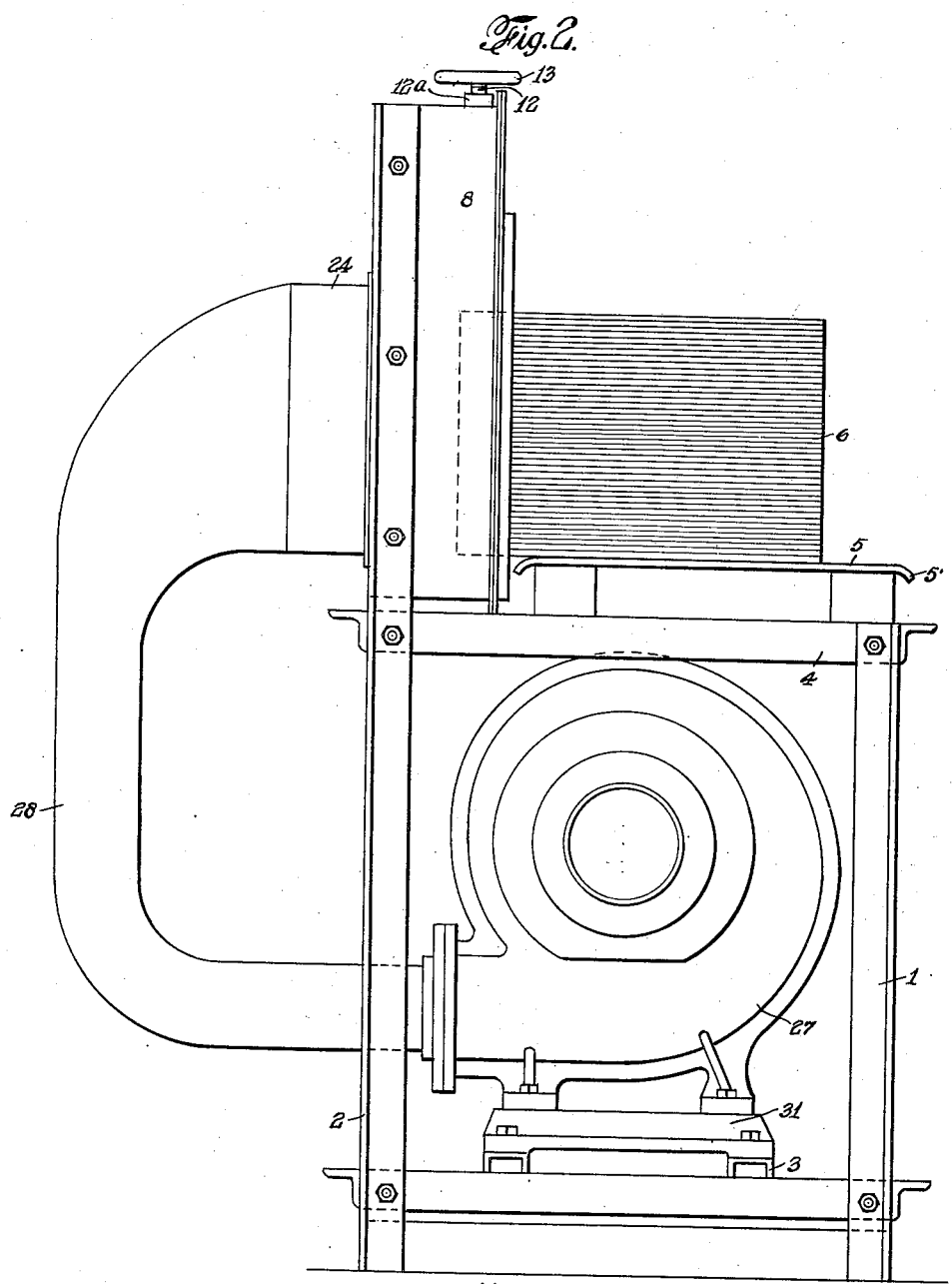

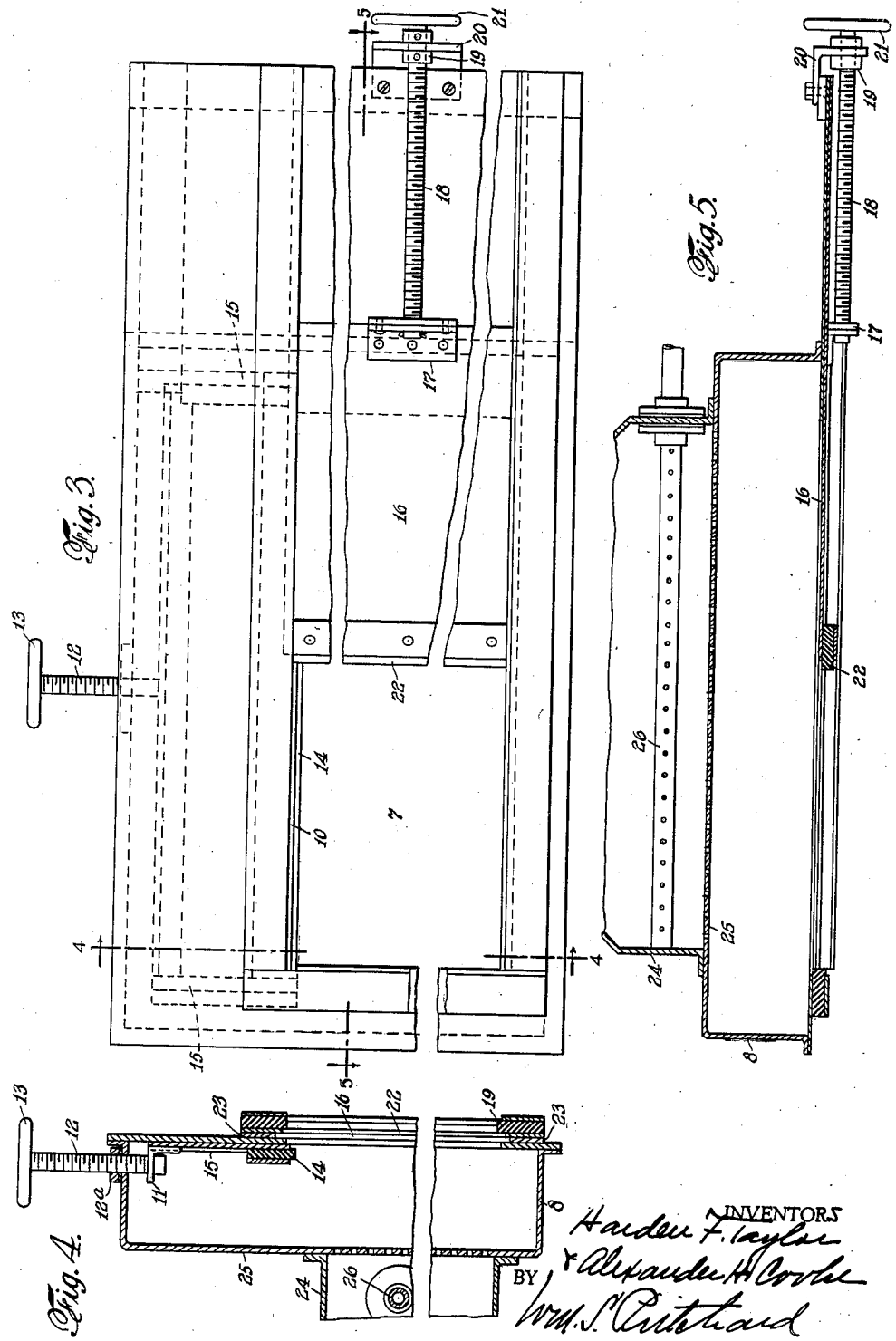

Patented Aug. 16, 1938

2,126,934

UNITED STATES PATENT OFFICE 2,126,934

APPARATUS FOR CONDITIONING CONTAINERS

Harden F. Taylor, Scarsdale, and Alexander H. Cooke, Atlantic Beach, N. Y., assignors to The Atlantic Coast Fisheries Company, New York, N. Y., a corporation of Maine Original application October 14, 1931, Serial No. 568,830, now Patent No. 2,011,426, issued August 13, 1935. Divided and this application July 12, 1935, Serial No. 30,986

10 Claims. (Cl. 99—234)

This invention relates to an apparatus for the treatment or conditioning of containers in which frozen comestibles are packed, whereby evaporation of moisture from the frozen comestibles may be substantially prevented during cold storage.

At the present time it is the usual practice to freeze foodstuffs, such as flesh foods, and after packing in containers, such as, for example, cartons, place them in cold storage until the foodstuffs are to be distributed. Frequently, the foodstuffs remain in storage for a considerable period of time. Due to the conditions prevailing in the cold storage rooms, moisture, and particularly that on or adjacent the surface, is evaporated from the frozen comestibles with the result that the foodstuffs are dried to a more or less degree and lose their delectable and savory taste.

We have found that, if prior to packing the frozen comestibles in containers, such as cartons, the latter are conditioned, as by impregnation with a medium comprising air saturated with steam, and preferably containing a small amount of free steam, the evaporation of moisture from the frozen comestibles packed therein during cold storage will be substantially eliminated.

It is, therefore, an object of this invention to provide an apparatus for the treatment or conditioning of containers in which frozen comestibles are packed, whereby evaporation of moisture from the frozen comestibles is substantially inhibited during cold storage.

Other objects will appear from the following description, appended claims and accompanying drawings wherein:

Figure 1 illustrates a front elevation of one form of the apparatus constituting the instant invention.

Figure 2 is a side elevation of the apparatus illustrated in Figure 1.

Figure 3 is an enlarged fragmentary front elevation of the steam box.

Figure 4 is a section taken on the lines 4—4 of Figure 3.

Figure 5 is a section taken on the lines 5—5 of Figure 3.

In accordance with the instant invention, frozen comestibles, such as flesh foods, for example, fish in the form of fillets or steaks, are frozen by one of the well-known quick freezing processes. The frozen comestibles are then packed in containers, for example, cartons, formed of corrugated paper board. The filled containers are then disposed in cold storage where they are kept until distributed.

Prior to the packing of the frozen comestibles in the containers, the latter are subjected to a conditioning treatment wherein the moisture content thereof is substantially increased. In the preferred embodiment of this invention, the increase in moisture content of the containers is accomplished by subjecting the containers to a mist or fog-like medium comprising air saturated with steam and preferably containing a small quantity of free steam.

The impregnating medium is preferably prepared by mingling air with steam as, for example, by blowing air into a chamber wherein steam is admitted or present. Due to the fact that relatively large volumes of air at normal temperature are employed, the temperature of the resultant mixture or impregnating medium is considerably less than that of the steam. In fact, the temperature of the impregnating medium is not materially higher than that of the air. Consequently, the adhesives or agglutinants employed in the manufacture of the containers are not deleteriously affected as would be the case if relatively high temperatures were utilized.

One specific embodiment of the process contemplates conditioning cartons in the collapsed state. According to this procedure the impregnating medium is caused to pass through the furrows of the corrugations of the material constituting the container.

Referring now to the drawings, wherein one form of an apparatus constituting the invention is shown and wherein like reference numerals designate like parts, the reference numerals 1 and 2 designate uprights which are joined together by means of transverse members 3 and 4 to define a frame on which various parts of the apparatus are mounted. On the upper transverse member 4 there is provided a platform 5 designed to support a stack of collapsed cartons 6, said support being positioned adjacent an opening 7 in the front of a steam conditioning box 8 secured to the upper portion of the upright 2 and more fully explained hereafter. In order that the pile of cartons may be readily slid into the conditioning chamber 8 through the opening 7 with ease, the ends 5' of the platform are preferably curved downwardly. Preferably, also, the upper surface of the platform 5 is disposed in substantially the same horizontal plane as the lower edge of the opening 7, which is provided with a strip of rubber 9 to effectively seal the bottom of the pile in the opening.

Inasmuch as the frozen comestibles are packed in containers of different sizes, the apparatus is devised to accommodate containers of divers dimensions and stacks of different heights. With this in view the opening 7 is made adjustable, preferable in two directions, whereby its height and width may be varied as desired or necessary.

For adjusting the height of the opening 7, there is provided a vertical slide 10 which at its upper end is secured through any suitable means, such as one or more angles 11, to a screw 12 rotatably mounted in a nut 12' on the top of the steam chamber 8. The screw 12 at its upper end carries a hand wheel 13 which, upon manual rotation in the desired direction, raises or lowers the slide, thus increasing or decreasing the effective height of the opening. In order to seal the boundary between the top of the stack and the slide 10, the latter is provided with a strip of rubber 14 on its lower edge. Best results are secured when the rubber strip 14 extends somewhat beyond the lower extremity of the slide 10. Preferably, also, the sides of the slide 10 cooperate with guides 15 which serve to properly guide the slide in its movement during adjustment.

The width of the opening 7 is adjusted by a horizontal slide 16 which is secured by an angle 17 to a screw 18 cooperating with a nut 19 carried by an angle 20, as shown in Figure 5. Upon rotation of the hand wheel 21 in the desired direction, the screw 18 will move in a horizontal direction carrying with it the slide 16, whereby the effective width of the opening will be adjusted. Similarly to the vertical slide 10, the horizontal slide 16 is provided at its forward end with a rubber strip 22 and is adapted to be guided in its movement by oppositely disposed guides 23.

The conditioning of the containers, as previously explained, is achieved by impregnating them with a fog or mist-like medium comprising air saturated with steam and preferably containing a small amount of free steam. In the apparatus illustrated, the impregnating medium is prepared by blowing air into a housing wherein steam is admitted.

The housing designated by the reference numeral 24 is positioned on the rear wall 25 of the conditioning chamber 8. Steam is supplied thereto by means of the perforated pipe 26 which is connected to some suitable source of supply, not shown. The air which is to be saturated with the steam is introduced in the housing by means of a blower 27 suitably connected thereto by a conduit 28. The air blown into the housing passes therethrough and through the perforated wall 25 into the conditioning chamber 8. In the course of its travel, the air mingles with and/or carries with it at least a portion of the steam present and/or being introduced in the housing. By varying the quantity of air and/or steam, the degree of saturation may be controlled. We prefer to employ sufficient air and steam so that not only will the air be saturated, but it will also contain a small quantity of free steam. Because of the fact that the air is of normal temperature, and a large volume thereof is used, the temperature of the impregnating medium is substantially that of the atmosphere or, at most, very slightly higher. In any event, the temperature of the impregnating medium is sufficiently low so that it will not injuriously affect the containers or any part thereof. The blower mechanism 27 is mounted on a platform 31 on the lower transverse member 3, and is operatively connected to a motor 29 mounted on a pedestal 30 adjacent thereto and also disposed on the transverse member 3.

In operation, a pile of collapsed containers is positioned on the platform 5 and pushed to the left, as shown in Figure 2, until a portion thereof is disposed within the steam chamber 8, as illustrated. The slides 10 and 16, through the manipulation of the respective hand wheels 13 and 21, are adjusted so that the rubber strips 14 and 22 respectively contact with the respective surfaces of the stack of cartons, forming tight seals therebetween.

It is to be noted that the containers in the collapsed state are positioned so that the corrugations thereof are at right angles to the opening 7.

After the stack of containers has been positioned in the condition chamber as described, steam is admitted by the proper manipulation of the steam valve. At the same time, the motor 29 is energized, whereby the blower 27 is operated with the result that air is forced through the conduit 28 into the housing 24 where it mingles with the steam introduced into said housing through the perforated pipe 26. As the blower continues its operation, the air saturated with steam is forced through the perforated wall 25 into the conditioning chamber 8 and thence through the furrows of the corrugations of the containers.

This treatment is continued until the desired amount of moisture has been added to the containers. After cutting off the steam supply and shutting off the motor, the hand wheels 13 and 21 are rotated in the direction necessary to increase the size of the opening, and the stack of cartons removed. Each container is then expanded or set up and the comestibles previously frozen are packed therein in the usual manner. The filled cartons are placed in a cold storage room and kept there until distributed. During storage, if any moisture is abstracted by the atmosphere constituting the cold storage chamber, it is removed from the container. In other words, the moisture which is abstracted during the storage period is that or a portion of that which has been introduced into the container by virtue of the preliminary conditioning treatment. Consequently substantially no moisture is evaporated from the comestibles packed in said cartons.

This application is a division of copending application Serial No. 568,830, filed October 14, 1931, now Patent No. 2,011,426, issued August 13, 1935.

Since it is obvious that various changes and modifications may be made in the above description without departing from the nature and spirit thereof, this invention is not restricted thereto except as set forth in the appended claims.

We claim:

1. An apparatus for the conditioning of containers formed of corrugated material and while in the collapsed state comprising a conditioning chamber having an opening wherein the ends of a plurality of collapsed containers formed of a corrugated material and piled in a stack may be positioned, means to adjust the size of said opening, and means to introduce air saturated with steam into said chamber whereby it passes through the corrugations and penetrates said containers.

2. An apparatus for the conditioning of containers formed of corrugated material and while in the collapsed state comprising a conditioning chamber having an opening wherein the ends of a plurality of collapsed containers formed of a corrugated material and piled in a stack may be positioned, means to adjust the size of said opening and form a sealed joint with said stack, a housing on the rear of said chamber, means to supply steam to said housing, and means to blow air into said housing whereby it will be saturated with said steam and pass from said housing to said chamber.

3. An apparatus for the conditioning of containers formed of corrugated material and while in the collapsed state comprising a conditioning chamber having a perforated rear wall and an opening in the front wall wherein a pile of collapsed containers formed of a corrugated material may be positioned, means to adjust the size of said opening and form a sealed joint with said stack, a housing on the rear wall of said chamber, means to supply steam to said housing and means to blow air into said housing whereby it will be saturated with said steam and pass from said housing through said perforations into said chamber and through said corrugations and impregnate said containers.

4. An apparatus for the conditioning of containers formed of corrugated material and while in the collapsed state comprising a conditioning chamber having a perforated rear wall and an opening in the front wall wherein a pile of collapsed containers formed of a corrugated material may be positioned, means to adjust the size of said opening and seal the pile of containers therein, a housing on the rear wall of said chamber, means to supply steam to said housing, and means to blow air into said housing whereby it will be saturated with said steam and pass from said housing through said perforations into said chamber and through said corrugations and impregnate said containers.

5. An apparatus for the conditioning of containers formed of corrugated material and while in the collapsed state comprising a conditioning chamber having an opening wherein the ends of a plurality of collapsed containers and piled in a stack may be positioned, means to adjust the size of the opening to accommodate piles of different sizes, and means to blow air saturated with steam into said chamber whereby it passes through the corrugations and impregnates the containers.

6. An apparatus for the conditioning of containers formed of corrugated material and while in the collapsed state comprising a conditioning chamber having an opening wherein the ends of a plurality of collapsed containers and piled in a stack may be positioned, means to adjust the height and width of the opening to accommodate piles of different sizes, and means to blow air saturated with steam into said chamber whereby it passes through the corrugations and impregnates the containers.

7. An apparatus for the conditioning of containers formed of corrugated material and while in the collapsed state comprising a conditioning chamber having an opening wherein the ends of a plurality of collapsed containers and piled in a stack may be positioned, means to adjust the size of the opening to accommodate piles of different sizes, means cooperating with the adjusting means to form sealed joints with the pile positioned in the opening, and means to blow air saturated with steam into said chamber whereby it passes through the corrugations and impregnates the containers.

8. An apparatus for the conditioning of containers formed of corrugated material and while in the collapsed state comprising a conditioning chamber having an opening wherein the ends of a plurality of collapsed containers and piled in a stack may be positioned, means to adjust the height and width of the opening to accommodate piles of different sizes, means cooperating with the adjusting means to form sealed joints with the pile positioned in the opening, and means to blow air saturated with steam into said chamber whereby it passes through the corrugations and impregnates the containers.

9. An apparatus for the conditioning of containers formed of corrugated material and while in the collapsed state comprising a conditioning chamber having an opening wherein the ends of a plurality of collapsed containers and piled in a stack may be positioned, means to adjust the size of the opening to accommodate piles of different sizes, means cooperating with the adjusting means to form sealed joints with the pile positioned in the opening, a housing communicating with said chamber, means to introduce steam in said housing, and means to blow air into said housing whereby said air will be saturated with steam and pass into said chamber and through the corrugations of the pile.

10. An apparatus for the conditioning of containers formed of corrugated material and while in the collapsed state comprising a conditioning chamber having an opening wherein the ends of a plurality of collapsed containers and piled in a stack may be positioned, means to adjust the height and width of the opening to accommodate piles of different sizes, means cooperating with the adjusting means to form sealed joints with the pile positioned in the opening, a housing communicating with said chamber, means to introduce steam in said housing, and means to blow air into said housing whereby said air will be saturated with steam and pass into said chamber and through the corrugations of the pile.

HARDEN F. TAYLOR.
ALEXANDER H. COOKE.